United States Patent Office 3,769,239
Patented Oct. 30, 1973

3,769,239
DEHYDROGENATING CATALYSTS OF RHENIUM METAL AND TUNGSTEN METAL OR MOLYBDENUM METAL ON ALUMINA SUPPORT
Bernard Juguin and Jean François Le Page, Rueil-Malmaison, and Jean Miquel, Paris, France, assignors to Institut Francois du Petrole, Rueil-Malmaison, France
No Drawing. Filed Apr. 19, 1971, Ser. No. 135,489
Claims priority, application France, Apr. 30, 1970, 7016132
Int. Cl. B01j 11/06
U.S. Cl. 252—465        8 Claims

ABSTRACT OF THE DISCLOSURE

New catalyst for dehydrogenation of saturated hydrocarbons, particularly of those containing from 3 to 40 carbon atoms per molecule, said catalyst containing rhenium and tungsten or molybdenum in proportion of 0.05 to 2% by weight and an alumina carrier.

---

The present invention relates to new catalysts which can be used particularly for the catalytic dehydrogenation of saturated hydrocarbons containing from 3 to 40 carbon atoms per molecule, so as to obtain the corresponding unsaturated hydrocarbons having the same number of carbon atoms in their molecule.

A very convenient application of the present invention consists of using the same for dehydrogenating straight-chain paraffinic hydrocarbons. The products obtained by dehydrogenating straight-chain hydrocarbons are in fact very suitable raw materials for the manufacture of detergent compositions of the sulfonate type or of the alkylaromatic sulfate type which are liable to biological degradation.

A very convenient application of the present invention consists of using the same for dehydrogenating straight-chain paraffinic hydrocarbons. The products obtained by dehydrogenating straight-chain hydrocarbons are in fact very suitable raw materials for the manufacture of detergent compositions of the sulfonate type or of the alkylaromatic sulfate type which are liable to biological degradation.

Another important application of the present invention is the separation of the dehydrogenation products followed with their conversion to long-chain alcohols by oxo synthesis.

Another application of the present invention consists of dehydrogenating the naphthenic hydrocarbons containing from 3 to 40 carbon atoms per molecule and particularly those having rings of 5 to 8 carbon atoms; during the dehydrogenation of these hydrocarbons, the naphthenes are almost completely converted to aromatic hydrocarbons.

It is well known that the saturated hydrocarbons may be converted to unsaturated hydrocarbons by catalytic dehydrogenation.

Among the catalysts previously proposed, there can be mentioned those which contain metals from groups VI and/or VIII of the periodic classification of elements.

The already known catalysts suffer from one or more of the following drawbacks:

Undesirable cracking aromatization and/or isomerization catalytic activity.
Excessive catalytic activity, leading to the formation of polyunsaturated hydrocarbons such as dienes and trienes and trienes, or, on the contrary insufficient activity making necessary to operate with a low flow rate of the reactants.
Short life of the catalyst.
Impossibility to regenerate the catalyst.

The present invention has therefore for object a catalyst for dehydrogenating saturated hydrocarbons whereby the undesirable secondary reactions such as cracking, aromatization and isomerization can be very substantially reduced, as well as the conversion to polyethylenic hydrocarbons. This catalyst has a long life, a high activity and can be easily regenerated.

The catalyst according to the invention comprises essentially:
(a) alumina,
(b) rhenium and
(c) tungsten or molybdenum.

The alumina which is used must be preferably of a low acidity. This low acidity may be determined by the known test of absorption of ammonia described for example in "Journal of Catalysis, 2, 211–222 (1963)"; the alumina carriers have preferably a heat of neutralization by ammonia adsorption lower than about 10 calories per gram at 320° C. under a pressure of 300 mm. Hg. The neutralization heat of the final catalyst is then substantially identical, i.e. lower than about 10 calories per gram of catalyst. The alumina may have for example a specific surface between 20 and 150 m.$^2$/g., preferably from 50 to 100 m.$^2$/g., with a porous volume for example between 0.4 and 0.8 cm.$^3$/g., 75% at least of the porosity corresponding to an average pore diameter between 100 and 500 angstroms. In these conditions, the specific surface and the porous volume of the first catalyst are then substantially identical to the above-mentioned values. The aluminae complying with these conditions are not however all equivalent, and the gamma alumina balls will be selected preferably. There can be used also, but less favourably, other alumina conglomerates such as extrudates or pellets fulfilling the above conditions.

When the acidity of the alumina carrier is deemed too high, it can be decreased by addition, before or after the introduction of the dehydrogenating elements, of certain basic compounds, or compounds capable of being decomposed in the reaction conditions, giving basic compounds; as example of such compounds, there are to be mentioned the oxides and hydroxides of alkaline or alkaline earth metals, as well as the carbonates and other salts of weak acids (acid dissociation constant preferably lower than $10^{-3}$) of the same metals, for example sodium hydroxide, potassium hydroxide, sodium carbonate, potassium carbonate, calcium acetate, sodium nitrate or magnesium acetate. It is generally unnecessary to add more than 2%, or even more than 1% of the basic compound (expressed by weight with respect to the catalyst carrier).

The rhenium content by weight will be for example between 0.05 and 2%, preferably between 0.1 and 0.5%, and that of tungsten or molybdenum will be for example between 0.05 and 2% and preferably between 0.1 and 0.5%.

The dehydrogenating elements (rhenium and tungsten or molybdenum) will be deposited separately or, preferably, simultaneously on the carrier by means of solutions containing the same, for example aqueous solutions of perrhenic acid, ammonium, sodium or potassium perrhenate, ammonium, sodium or potassium meta or para tungstate, ammonium, sodium or potassium molybdate.

The dehydrogenating elements being deposited on the carrier, the catalyst is then dried, roasted by heating in oxidizing atmosphere at a temperature for example between 300 and 600° C., then reduced in a hydrogen stream at a temperature for example between 350 and 700° C. for 2 to 30 hours, with a hydrogen hourly rate of about 100 to 1000 times the catalyst volume. This last operation is preferably conducted in the dehydrogenation reactor.

The rotating step may also be omitted and the reduction conducted directly.

The reduction temperature is very important:

When the dehydrogenating elements are rhenium and tungsten, the reduction temperature will be preferably between 500 and 550° C.

When the catalyst comprises rhenium and molybdenum, the reduction temperature will be preferably between 550 and 600° C.

The conditions of use of these catalysts also are not immaterial.

When dehydrogenating paraffinic hydrocarbons of the straight-chain type, in order to obtain convenient conversion rates, the temperature will be chosen between 300 and 600° C., preferably between 400 and 500° C., for hourly rates by volume of liquid saturated hydrocarbons of from 0.1 to 30 times the catalyst volume, and advantageously between 2 and 10, with absolute pressures of 0.1 to 20 bars and preferably between 1 and 5 bars. The hydrogen partial pressure has a considerable effect on the stability of those catalysts; the molar ratio of the hydrogen to the hydrocarbons at the inlet of the reactor may be between 0.1 and 30, advantageously between 2 and 20, and preferably between 8 and 15. For dehydrogenating cyclic hydrocarbons, in order to obtain convenient conversion rates, the temperature will be chosen between 300 and 600° C., preferably between 500 and 600° C., for hourly rates by volume of liquid hydrocarbons between 0.1 and 20 times the catalyst volume, and advantageously between 2 and 10 times this volume, with absolute pressures of 1 to 60 bars, and preferably between 5 and 40 bars. The hydrogen partial pressure has a significant action on the stability of these catalysts; the molar ratio of the hydrogen to the hydrocarbons at the inlet of the reactor may be between 0.5 and 30, advantageously between 2 and 10.

As examples of hydrocarbons to be dehydrogenated there will be mentioned propane, n-butane, isobutane, n-hexane, n-dodecane, n-hexadecane, cyclopentane, cyclohexane, cycloheptane, cyclooctane and methyl-cyclopentane. The following non-limitative examples are given for illustrating the invention.

EXAMPLE 1

A $C_{10}$–$C_{14}$ normal paraffin cut is contacted in a dehydrogenation reactor made of steel of a 2 cm. internal diameter and 40 cm. length with either a catalyst A based on rhenium and tungsten, or with a catalyst B based on rhenium and molybdenum. The metals of these catalysts A and B are deposited on gamma alumina balls. These catalysts have been prepared by impregnating gamma alumina balls of a 69 m.$^2$/g. specific surface, having a porous volume of 58 cc. per 100 g., 75% of this porous volume corresponding to pores of an average diameter between 100 and 500 angstroms. The heat of neutralization by ammonia adsorption of this gamma alumina was 7 calories per gram. In order to obtain catalyst A, 100 g. of these alumina balls were impregnated with 58 cc. of an aqueous solution containing 20.4 cc. of a solution of perrhenic acid containing 0.98% by weight of rhenium and 37.6 cc. of a solution containing 0.273 g. of ammonium meta tungstate with a 92.3% content by weight of $WO_3$.

In order to obtain catalyst B, 100 g. of alumina balls have been impregnated with 58 cc. of a solution containing 20.4 cc. of a perrhenic acid solution containing 0.98% by weight of rhenium, and 37.6 cc. of a solution containing 0.36 g. of ammonium para-molybdate with a 81.5% by weight content of $MoO_3$.

The contact is maintained for 3 hours; after 3 hours the alumina balls have completely absorbed the solution. They are dried in an oven at 100° C. for 6 hours, then roasted in an air stream for 2 hours at 400° C., and thereafter for 2 hours at 500° C.

After cooling, the catalysts A and B are transferred to the dehydrogenation reactor and reduced during about 12 hours in a hydrogen stream of 50 liters per hour: the reduction temperature was 530° C. for catalyst A and 575° C. for catalyst B. The resulting catalyst A contains 0.2% by weight of rhenium and 0.2% by weight of tungsten. The catalyst B, thus obtained contains 0.2% by weight of rhenium and 0.2% by weight of molybdenum.

The $C_{10}$–$C_{14}$ cut is passed through catalyst A or B at a spatial velocity of 4 volumes of liquid per volume of catalyst per hour, at a temperature of 450° to 470° C., an absolute pressure of one bar, with a molar ratio of the hydrogen to the $C_{10}$–$C_{14}$ cut equal to 12 at the inlet of the reactor; then the liquid and gaseous products issuing from the reactor have been analyzed in function of time, by measurement of the bromine number chromatography in gaseous phase, mass spectrometry and nuclear magnetic resonance; the results are shown in Table 1.

TABLE I

| Catalyst | Age of catalyst in hours | Reaction temperature, ° C. | Composition by weight of the liquid product | | | | | Percent of the charge cracked to $C_1$–$C_5$ hydrocarbons |
|---|---|---|---|---|---|---|---|---|
| | | | n-Paraffines | n-Monoolefines | Iso-olefines plus isoparaffines | Diolefines | Aromatic hydrocarbons | |
| A | 4 | 470 | 83.6 | 15.1 | 0.2 | 0.2 | 0.9 | 0.1 |
| | 50 | 470 | 85.9 | 13.6 | 0.1 | 0.1 | 0.3 | <0.1 |
| | 100 | 470 | 86.9 | 12.8 | 0.1 | 0.1 | 0.1 | <0.1 |
| | 200 | 470 | 87.8 | 12.2 | 0.1 | 0.1 | Traces | <0.1 |
| | 300 | 460 | 89.7 | 10.2 | 0.1 | Traces | 0 | <0.1 |
| | 1,000 | 460 | 92.2 | 7.7 | 0.1 | Traces | 0 | <0.1 |
| B | 4 | 470 | 86.5 | 12.3 | 0.2 | 0.2 | 0.8 | 0.1 |
| | 50 | 470 | 88.5 | 11.1 | 0.1 | 0.1 | 0.2 | 0.1 |
| | 100 | 470 | 89.2 | 10.6 | 0.1 | Traces | 0.1 | <0.1 |
| | 200 | 470 | 89.7 | 10.2 | 0.1 | Traces | Traces | <0.1 |
| | 300 | 460 | 91.5 | 8.4 | 0.1 | 0 | 0 | <0.1 |
| | 1,000 | 460 | 93.9 | 6 | 0.1 | 0 | 0 | <0.1 |

There can be observed the great stability and the very high selectivity of these two catalysts.

EXAMPLE 2

A $C_{10}$–$C_{14}$ cut is passed through the catalyst A of Example 1, at a spatial velocity of 3 volumes of liquid per volume of catalyst per hour instead of 4 in Example 1, and under an absolute pressure of 3 bars instead of 1 in Example 1. The other experimental conditions are those of Example 1. After a run of 50 hours in these conditions, the liquid product issuing from the reactor had the following composition by weight:

|  | Percent |
|---|---|
| n-Paraffines | 85.9 |
| n-Monoolefins | 13.4 |
| Isoolefines+isoparaffines | 0.2 |
| Diolefines | 0.1 |
| Aromatic hydrocarbons | 0.4 |

The percent of the charge cracked to $C_1$–$C_5$ hydrocarbons was 0.1% by weight.

After 1000 hours, these figures were respectively 88%, 11.8%, 0.1%, 0%, 0.1%, less than 0.1% for the cracking, and after 2000 hours of operation, respectively 88.9%, 10.9%, 0.1%, 0%, 0.1% and less than 0.1% for the cracking.

There can be observed the very great stability of this type of catalysts and also the effect of the operating pressure on this stability.

EXAMPLE 3

The $C_{10}$–$C_{14}$ cut is passed through the catalyst A of Example 1 under the operating conditions of Example 1.

After 1000 hours, the reaction temperature has been decreased down to 440° C. under a nitrogen stream, and the catalyst has been regenerated by an air stream of 10 liters per liter of catalyst per hour; the temperature thus increased quickly up to 535° C. and thereafter progressively decreased down to 440° C.; the total regeneration time was 5 hours. The temperature was then increased up to 530° C. under a nitrogen stream, and the catalyst again reduced in a hydrogen stream of 50 liters per hour during 15 hours.

The temperature was then decreased to 470° C. under a hydrogen stream and the $C_{10}$–$C_{14}$ cut injected in the same conditions as previously.

After a 200 hours run in these conditions, the liquid product issuing from the reactor had the following composition by weight:

|  | Percent |
|---|---|
| n-Paraffins | 87.8 |
| n-Monoolefins | 11.9 |
| Isoolefins+isoparaffins | 0.1 |
| Diolefins | 0.1 |
| Aromatic hydrocarbons | 0.1 |

The percent of the charge cracked to $C_1$–$C_5$ hydrocarbons was less than 0.1% by weight.

The results after 200 hours are thus practically as good as before the regeneration.

The catalysts according to the invention are therefore regenerable.

EXAMPLE 4

By using the operation technique of Example 1 there are prepared 4 catalysts having the following composition:

$A_2$: 0.05% of rhenium and 0.06% of tungsten
$A_3$: 1% of rhenium and 0.9% of tungsten
$B_2$: 0.06% of rhenium and 0.05% of molybdenum
$B_3$: 1% of rhenium and 1.1% of molybdenum.

The catalysts $A_2$ and $A_3$ have been reduced at 530° C. and the catalysts $B_2$ and $B_3$ at 575° C.

The operating conditions are those of Example 1, the temperature being 470° C., and the results are shown in Table II.

By comparing these results to those of Example 1, there can be observed that it is advantageous to operate with contents of catalytic metals between 0.1 and 0.5%; when the content of active elements is too low, the activity and the stability are poor; and when the content in active elements is too high, the activity and the stability are not substantially higher, while, on the contrary, the selectivity is much lower.

TABLE II

| Catalyst | Age of catalyst in hours | Composition by weight of the liquid product | | | | | Percent of the charge cracked to $C_1$–$C_5$ hydrocarbons |
|---|---|---|---|---|---|---|---|
| | | n-Paraffins | n-Mono-olefins | Iso-olefins plus iso-paraffins | Diolefins | Aromatic hydrocarbons | |
| $A_2$ | 4 | 92 | 7.7 | 0.1 | 0.1 | 0.1 | <0.1 |
|  | 50 | 94.1 | 5.8 | 0.1 | 0 | 0 | <0.1 |
|  | 200 | 96.5 | 3.5 | 0 | 0 | 0 | <0.1 |
| $A_3$ | 4 | 80.7 | 15.9 | 0.7 | 0.6 | 2.1 | 0.4 |
|  | 50 | 83.2 | 14.3 | 0.6 | 0.5 | 1.4 | 0.3 |
|  | 200 | 85.5 | 12.7 | 0.5 | 0.4 | 0.9 | 0.2 |
| $B_2$ | 4 | 93.7 | 6 | 0.1 | 0.1 | 0.1 | <0.1 |
|  | 50 | 95.5 | 4.5 | 0 | 0 | 0 | <0.1 |
|  | 200 | 97.3 | 2.7 | 0 | 0 | 0 | <0.1 |
| $B_3$ | 4 | 83.6 | 13 | 0.6 | 0.6 | 2.2 | 0.3 |
|  | 50 | 85.9 | 11.7 | 0.5 | 0.4 | 1.5 | 0.3 |
|  | 200 | 87.5 | 10.8 | 0.4 | 0.3 | 1 | 0.2 |

EXAMPLE 5

This example relates to dehydrogenation of a steam-cracking gasoline. The feed has the following composition by weight:

|  | Percent |
|---|---|
| Benzene | 52.9 ⎫ |
| Toluene | 18.2 ⎪ |
| Meta+para xylenes | 22 ⎬ 74.4 |
| Ortho xylene | 0.45 ⎪ |
| Ethylbenzene | 0.65 ⎭ |
| Paraffins | 9 |
| Naphthenes | 16.6 |

Its main characteristics are as follows:

| Bromine number | <0.2 |
|---|---|
| Maleic anhydride value | Zero |
| Potential gums | Zero |
| ASTM distillation: | |
| Initial point, ° C. | 52 |
| Final point, ° C. | 151 |
| Total sulfur, p.p.m. by weight | 2 |

This feed is passed, together with hydrogen, through a reactor, at an average temperature of 560° C. (inlet temperature of 580° C. and outlet temperature of 530° C.). The catalyst A of Example 1 is used; the pressure is 15 bars, the hourly flow rate by volume of the feed is twice the catalyst volume and the molar ratio of the hydrogen to the feed is 5.

The product issued from the reactor has the following composition by weight:

|  | Percent |
|---|---|
| Paraffins | 10.9 |
| Naphthenes | 0.1 |
| Aromatic hydrocarbons: | |
| Benzene | 61 ⎫ |
| Toluene | 23.3 ⎪ |
| Meta+para xylenes | 3 ⎬ 89 |
| Ortho xylene | 0.9 ⎪ |
| Ethylbenzene | 0.8 ⎭ |

EXAMPLE 6

Example 5 is repeated but with the use of catalyst B of Example 1.

The product issued from the reactor has the following composition by weight:

|  | Percent |
|---|---|
| Paraffins | 11.8 |
| Naphthenes | 0.6 |
| Aromatic hydrocarbons: | |
| Benzene | 60.4 ⎫ |
| Toluene | 22.8 ⎪ |
| Meta+para xylenes | 2.9 ⎬ 87.6 |
| Ortho xylene | 0.8 ⎪ |
| Ethylbenzene | 0.7 ⎭ |

EXAMPLE 7

Example 5 is repeated but with the use of catalyst $A_2$ of Example 4.

The product issued from the reactor has the following composition by weight:

|  | Percent |
|---|---|
| Paraffins | 9.9 |
| Naphthenes | 10.4 |
| Aromatic hydrocarbons: | |
| Benzene | 56.3 ⎫ |
| Toluene | 19.7 ⎪ |
| Meta+para xylenes | 2.4 ⎬ 79.9 |
| Ortho xylene | 0.6 ⎪ |
| Ethylbenzene | 0.7 ⎭ |

EXAMPLE 8

Example 5 is repeated but with the use of catalyst $A_3$ of Example 4.

The product issued from the reactor has the following composition by weight:

|  | Percent |
|---|---|
| Paraffins | 11.9 |
| Naphthenes | 0.1 |
| Aromatic hydrocarbons: | |
| Benzene | 60.6 ⎫ |
| Toluene | 23 ⎪ |
| Meta+para xylenes | 2.9 ⎬ 88 |
| Ortho xylene | 0.8 ⎪ |
| Ethylbenzene | 0.7 ⎭ |

EXAMPLE 5A

This example is given for comparison purpose.

Example 5 is repeated but the catalyst used is prepared from a transition alumina whose heat of neutralization by ammonia adsorption is 13 calories per gram, having a specific surface of 100 m.²/g. and a porous volume of 0.9 cm.³/g. All other characteristics of the catalyst are the same as those of catalyst A of Example 1.

The product issued from the reactor has the following composition by weight:

|  | Percent |
|---|---|
| Paraffins | 14.1 |
| Naphthenes | 0.1 |
| Aromatic hydrocarbons: | |
| Benzene | 59.30 ⎫ |
| Toluene | 22.10 ⎪ |
| Meta+para xylenes | 2.90 ⎬ 85.8 |
| Ortho xylene | 0.80 ⎪ |
| Ethylbenzene | 0.70 ⎭ |

EXAMPLE 5B

This example is also given for comparison purpose.

Example 5 is repeated but the catalyst is prepared from an alpha aumina having a heat of neutralization by ammonia adsorption of 4 calories per gram, a specific surface of 8 m.²/g. and a porous volume of 0.5 cm.³/g. All other characteristics of the catalyst are the same as those of catalyst A of Example 1.

The product issued from the reactor had the following composition by weight:

|  | Percent |
|---|---|
| Paraffins | 11.8 |
| Naphthenes | 4 |
| Aromatic hydrocarbons: | |
| Benzene | 58.30 ⎫ |
| Toluene | 21.50 ⎪ |
| Meta+para xylenes | 2.90 ⎬ 84.2 |
| Ortho xylene | 0.80 ⎪ |
| Ethylbenzene | 0.70 ⎭ |

What we claim as this invention is:

1. A catalyst consisting essentially of (a) alumina, (b) rhenium metal, and (c) tungsten metal or molybdenum metal, wherein the rhenium and tungsten or molybdenum contents are each between 0.05 and 2% by weight.

2. A catalyst according to claim 1 wherein (c) is tungsten metal.

3. A catalyst according to claim 1 wherein (c) is molybdenum metal.

4. A catalyst according to claim 1 wherein the alumina has a heat of neutralization by ammonia adsorption of less than 10 calories per gram at 320° C. under a pressure of 300 mm. Hg.

5. A catalyst according to claim 1 wherein said contents are each between 0.1 and 0.5% by weight.

6. A catalyst according to claim 1, having a specific surface between 20 and 150 m.²/g.

7. A catalyst according to claim 1 having a porous volum between 0.4 and 0.8 cm.³/g.

8. A catalyst according to claim 1 having a heat of neutralization by ammonia lower than about 10 calories per gram of catalyst at 320° C. under a reduced pressure of 300 mm. Hg.

References Cited

UNITED STATES PATENTS

| 3,649,566 | 3/1972 | Hayes et al. | 252—465 X |
| 2,638,455 | 5/1953 | Pitzer | 252—465 |
| 3,117,097 | 1/1964 | Janoski | 252—465 |

FOREIGN PATENTS

| 682,446 | 5/1930 | France | 252—467 |

OTHER REFERENCES

Blackham et al.: Ind. Eng. Chem., Prod. Res. Develop., 4 (4), 269–73 (1965), "Rhenium as a Catalyst in Hydrocarbon Reforming Reactions."

DANIEL E. WYMAN, Primary Examiner

W. J. SHINE, Assistant Examiner

U.S. Cl. X.R.

208—136; 252—461